United States Patent [19]

Watanabe et al.

[11] Patent Number: 5,196,177
[45] Date of Patent: Mar. 23, 1993

[54] PRODUCTION OF STABLE AQUEOUS SILICA SOL

[75] Inventors: Yoshitane Watanabe; Yoshiyuki Kashima; Kenji Tanimoto, all of Funabashi, Japan

[73] Assignee: Nissan Chemical Industries, Ltd., Tokyo, Japan

[21] Appl. No.: 641,709

[22] Filed: Jan. 15, 1991

[30] Foreign Application Priority Data

Jan. 17, 1990 [JP] Japan ................................ 2-7305

[51] Int. Cl.$^5$ .................... B01J 13/00; C01B 33/14
[52] U.S. Cl. .................... 423/335; 252/313.2; 423; 423/338; 423/330.1
[58] Field of Search ............. 423/326, 328, 329, 331, 423/332, 335, 338; 501/12; 252/313.2

[56] References Cited

U.S. PATENT DOCUMENTS

| | | | |
|---|---|---|---|
| 2,574,902 | 11/1951 | Bechtold et al. | 252/313 |
| 2,577,485 | 12/1951 | Rule | 252/313 |
| 2,801,902 | 10/1951 | Alexander et al. | |
| 4,217,240 | 8/1980 | Bergna | 423/338 |
| 5,100,581 | 3/1992 | Watanabe et al. | 252/313.2 |

FOREIGN PATENT DOCUMENTS 0243166 10/1987 European Pat. Off.
62-278114 12/1987 Japan.

OTHER PUBLICATIONS

Iler, Ralph K., "The Chemistry of Silica, Solubility, Polymerization, Colloid and Surface Properties, and Biochemistry." pp. 363-364 (1979).

*Primary Examiner*—Olik Chaudhuri
*Assistant Examiner*—Ken Horton
*Attorney, Agent, or Firm*—Oliff & Berridge

[57] ABSTRACT

A sol of flat silica particles (100-1000 nm in size) is produced by the following steps (a) to (d) from an acidic aqueous sol ($S_0$) of negatively charged silica particles (7-30 nm in diameter) and an aqueous solution (B) of basic aluminum or zirconium salt.

(a) mixing 100 parts by weight (as $SiO_2$) of the sol ($S_0$) with 0.2-10 parts by weight (as $Al_2O_3$ or $ZrO_2$) of the aqueous solution (B), and adjusting the resulting sol to pH 4-7, thereby yielding a sol ($S_1$), (b) mixing 100 parts by weight (as $SiO_2$) of the sol ($S_1$) with 20-200 parts by weight (as $SiO_2$) of the sol ($S_0$), and adjusting the resulting sol to pH 4-7, thereby yielding a sol ($S_2$), (c) mixing 100 parts by weight (as $SiO_2$) of the sol ($S_2$) with the aqueous solution (B) in an amount corresponding to 2-50% of the amount (as $Al_2O_3$ or $ZrO_2$ in parts by weight) added to 100 parts by weight (as $SiO_2$) of the sol ($S_0$) used in step (a), and adjusting the resulting sol to pH 4-7, thereby yielding a sol ($S_3$), and (d) mixing 100 parts by weight (as $SiO_2$) of the sol ($S_3$) with the sol ($S_0$) in an amount corresponding to 10-95% of the amount (as $SiO_2$ in parts by weight) added to 100 parts by weight (as $SiO_2$) of the sol ($S_1$) in step (b), and adjusting the resulting sol to pH 4-7, thereby yielding a sol ($S_4$).

10 Claims, No Drawings

PRODUCTION OF STABLE AQUEOUS SILICA SOL

BACKGROUND OF THE INVENTION

1. Field of the Invention

The present invention relates to a process for producing a stable aqueous sol of colloidal silica having a flat particulate shape. This silica sol forms a film when dried on a substrate and hence finds use in the coating and other application areas.

2. Description of the Prior Art

U.S. Pat. No. 2801902 mentions that a sol of negatively charged spherical colloidal silica (5-100 nm in diameter) turns into a sol of platy colloidal silica, with individual particles consisting of spherical colloidal silica particles joined to one another two-dimensionally, when heated after the addition of a cationic surface active agent.

Japanese Patent Laid-open No. 278114/1987 discloses a process for producing minute platy silica particles by heating, after the addition of an anionic surface active agent to a sol of positively charged colloidal silica coated with alumina, titania, zirconia, thoria, or the like.

These known processes consist of adding a surface active agent to the sol for the planar aggregation of colloidal silica particles and heating the sol for the joining of aggregated colloidal silica particles to one another.

SUMMARY OF THE INVENTION

It is an object of the present invention to provide a process for producing a silica sol of flat particles (100-1000 nm in diameter) by the planar aggregation of colloidal silica particles (7-30 nm in diameter) without need of any undesirable surface active agent and heating. The present invention is embodied in a process for producing an aqueous silica sol which comprises the steps of:

(a) mixing 100 parts by weight (as $SiO_2$) of an acidic aqueous sol ($S_0$) of negatively charged silica (7-30 nm in particle diameter) having pH 2-5 and containing 2-50 wt% $SiO_2$, with 0.2-10 parts by weight (as $Al_2O_3$ or $ZrO_2$) of an aqueous solution (B) containing 1-50 wt% basic aluminum or zirconium salt, with stirring at 0°-100° C., continuing stirring for 0.1-5 hours, and adjusting the resulting sol to pH 4-7 with an alkaline aqueous solution, thereby yielding an aqueous sol ($S_1$) of positively charged silica, (b) mixing 100 parts by weight (as $SiO_2$) of the sol ($S_1$) obtained in step (a) with 20-200 parts by weight (as $SiO_2$) of the sol ($S_0$) with stirring at 0°-100° C., continuing stirring for 0.1-5 hours, and adjusting the resulting sol to pH 4-7 with an alkaline aqueous solution, thereby yielding an aqueous sol ($S_2$) of negatively charged silica, (c) mixing 100 parts by weight (as $SiO_2$) of the sol ($S_2$) obtained in step (b) with the aqueous solution (B)in an amount corresponding to 2-50% of the amount (as $Al_2O_3$ or $ZrO_2$ in parts by weight) added to 100 parts by weight (as $SiO_2$) of the sol ($S_0$) used in step (a) with stirring at 0°-100° C., continuing stirring for 0.1-5 hours, and adjusting the resulting sol to pH 4-7 with an alkaline aqueous solution, thereby yielding an aqueous sol ($S_3$) of positively charged silica, and (d) mixing 100 parts by weight (as $SiO_2$) of the sol ($S_3$) obtained in step (c) with the sol ($S_0$) in an amount corresponding to 10-95% of the amount (as $SiO_2$ in parts by weight) added to 100 parts by weight (as $SiO_2$) of the sol ($S_1$) in step (b) with stirring at 0°-100° C., continuing stirring for 0.1-5 hours, and adjusting the resulting sol to pH 4-7 with an alkaline aqueous solution, thereby yielding an aqueous sol ($S_4$) of negatively charged silica.

According to a preferred embodiment, the above-mentioned process is followed by the steps of:

(e) mixing 100 parts by weight (as $SiO_2$) of the sol ($S_4$) obtained in step (d) with the aqueous solution (B) in an amount corresponding to 2-50% of the amount (as $Al_2O_3$ or $ZrO_2$ in parts by weight) added to 100 parts by weight (as $SiO_2$) of the sol ($S_2$) used in step (c) with stirring at 0°-100° C., continuing stirring for 0.1-5 hours, and adjusting the resulting sol to pH 4-7 with an alkaline aqueous solution, thereby yielding an aqueous sol ($S_5$) of positively charged silica, and (f) mixing 100 parts by weight (as $SiO_2$) of the sol ($S_5$) obtained in step (e) with the sol ($S_0$) in an amount corresponding to 10-95% of the amount (as $SiO_2$ in parts by weight) added to 100 parts by weight (as $SiO_2$) of the sol ($S_3$) in step (d) with stirring at 0°-100° C., continuing stirring for 0.1-5 hours, and adjusting the resulting sol to pH 4-7 with an alkaline aqueous solution, thereby yielding an aqueous sol ($S_6$) of negatively charged silica.

DETAILED DESCRIPTION OF THE INVENTION

The basic aluminum salt and basic zirconium salt used in the present invention preferably include basic aluminum chloride [$Al(OH)_2Cl$ and $Al_2(OH)_5Cl$], basic aluminum acetate [$Al(OH)_2(CH_3COO) \cdot \frac{1}{3}H_3BO_3$], basic aluminum nitrate [$Al_2(OH)_5NO_3$ and $Al(OH)(NO_3)_2$], basic aluminum formate [$Al(OH)_2(HCOO)$], zirconium oxychloride [$ZrOCl_2 \cdot 8H_2O$], zirconium oxynitrate [$ZrO(NO_3)_2$], and zirconium oxyacetate [$ZrO(CH_3COO)_2$], of which $Al_2(OH)_5Cl$ is particularly preferable. These basic metal salts may be used in combination with one another in the form of 1-50 wt% aqueous solution. They may be replaced by a basic salt of titanium, tin, indium, or cerium.

The process of the present invention starts with an acidic aqueous sol of negatively charged silica particles 7-30 nm in diameter (designated as $S_0$). It can be easily prepared by a known process. The colloidal silica particles may be either spherical or non-spherical; but spherical ones are preferable. It should preferably be prepared by treating an alkaline aqueous sol of spherical colloidal silica particles 7-30 nm in diameter, with a hydrogen-type cation-exchange resin. The resulting product is a stable acidic aqueous sol (pH 2-5) containing 2-50 wt% $SiO_2$. The preferred one is an acidic aqueous sol (pH 2-5) containing 5-30 wt% $SiO_2$, with a particle size 7-20 nm in diameter.

The acidic aqueous silica sol ($S_0$) may be replaced by a silica sol of flat large particles which is obtained by the process of the present invention. In this case, it is possible to produce a silica sol of enlarged particles.

In step (a) of the process of the present invention, the acidic aqueous silica sol ($S_0$) is mixed with an aqueous solution of the above-mentioned basic metal salt in an amount of 0.2-10 wt% (as $Al_2O_3$ or $ZrO_2$) based on the amount of $SiO_2$ in the silica sol ($S_0$). Mixing should be carried out with stirring (preferably vigorous stirring) at 0°-100° C., preferably 0°-50° C., for 0.1-5 hours. Thus there is obtained an aqueous sol containing colloidal silica particles coated with Al ions or Zr ions. Then, this aqueous sol is adjusted to pH 4-7 with an alkaline aqueous solution to give a positively charged silica sol (designated as $S_1$).

The alkaline aqueous solution may be formed from an alkali selected from alkali metal hydroxides (such as lithium, sodium, potassium, rubidium, and cesium hydroxides), ammonium hydroxide, water-soluble quaternary ammonium hydroxides, guanidine hydroxide, water-soluble alkylamines (such as ethylamine, isopropylamine, and n-propylamine), water-soluble alkanolamines (such as monoethanolamine and triethanolamine), benzylamine, and piperidine. Preferred alkalis are lithium, sodium, potassium, and ammonium hydroxides. The alkaline substance should be used in the form of aqueous solution ranging in concentration from 0.5 to 30 wt%. In addition, the alkaline substance should be added in an amount of 0.005 to 5 wt% in terms of $M_2O$ with reference to the amount of $SiO_2$ in the silica sol, where M denotes the alkali metal, ammonium group, quaternary ammonium group, or amine constituting the alkaline substance.

In step (b) of the process of the present invention, 100 parts by weight (as $SiO_2$) of the positively charged silica sol ($S_1$) obtained in the above-mentioned step (a) is mixed with 20-200 parts by weight (as $SiO_2$) of the above-mentioned negatively charged silica sol ($S_0$). Mixing should be carried out with stirring (preferably vigorous stirring) at 0°-100° C., preferably 0°-50° C., for 0.1-5 hours. The resulting mixture is adjusted to pH 4-7 with an alkaline aqueous solution to give a negatively charged silica sol (designated as $S_2$) containing planar aggregates composed of the above-mentioned negatively charged silica and positively charged silica. The planar aggregates have such a particle size that the thickness is 7-90 nm (which is less than three times the particle size of the colloidal silica in the sol ($S_0$)) and the diameter is 50-1000 nm (which is 5-150 times the thickness). Unfortunately, this silica sol ($S_2$) is not highly stable.

In step (c) of the process of the present invention, 100 parts by weight as $SiO_2$ of the above-mentioned sol ($S_2$) is mixed with an aqueous solution of the above-mentioned basic metal salt in an amount corresponding to 2-50% of the amount (as $Al_2O_3$ or $ZrO_2$ in parts by weight) added to 100 parts by weight (as $SiO_2$) of the silica sol ($S_0$) used in step (a). Mixing should be carried out with stirring (preferably vigorous stirring) at 0°-100° C., preferably 0°-50° C., for 0.1-5 hours. Thus there is obtained an aqueous sol containing colloidal silica particles coated with Al ions or Zr ions. Then, this aqueous sol is adjusted to pH 4-7 with the same alkaline aqueous solution as mentioned above to give a positively charged silica sol (designated as $S_3$).

In step (d) of the process of the present invention, 100 parts by weight as $SiO_2$ of the above-mentioned sol ($S_3$) is mixed again with the negatively charged silica sol ($S_0$) in an amount corresponding to 10-95% of the amount (as $SiO_2$ in parts by weight) added to 100 parts by weight (as $SiO_2$) of the silica sol ($S_1$) in step (b). Mixing should be carried out with stirring (preferably vigorous stirring) at 0°-100° C., preferably 0°-50° C., for 0.1-5 hours. Then, this aqueous sol is adjusted to pH 4-7 with the same alkaline aqueous solution as mentioned above to give a negatively charged silica sol (designated as $S_4$) containing planar aggregates composed of negatively charged silica (depived from $S_0$) and positively charged silica (derived from $S_3$).

According to observation by electron microscopy, this sol ($S_4$) was found to contain flat colloidal particles characterized by its much larger diameter in planar direction compared with its thickness. The thickness is less than 5 times (1-3 times on average) the diameter of the colloidal particles in the sol ($S_0$), whereas the diameter (in the planar direction) is 10-150 times the thickness. In other words, this flat particle has an average thickness of 7-100 nm and a diameter in planar direction of 100-1000 nm.

The sol ($S_4$) obtained in step (d) can be changed to more stable sol by the additional steps (e) and (f).

In step (e), 100 parts by weight as $SiO_2$ of the above-mentioned sol ($S_4$) is mixed with an aqueous solution of the above-mentioned basic metal salt in an amount corresponding to 2-50% of the amount (as $Al_2O_3$ or $ZrO_2$ in parts by weight) added to 100 parts by weight (as $SiO_2$) of the silica sol ($S_2$) used in step (c). Mixing should be carried out with stirring (preferably vigorous stirring) at 0°-100° C., preferably 0°-50° C., for 0.1-5 hours. The resulting sol is adjusted to pH 4-7 with the same alkaline aqueous solution as mentioned above to give a positively charged silica sol (designated as $S_5$).

In step (f), 100 parts by weight as $SiO_2$ of the above-mentioned sol ($S_5$) is mixed again with the negatively charged silica sol ($S_0$) in an amount corresponding to 10-95% of the amount (as $SiO_2$ in parts by weight) added to 100 parts by weight (as $SiO_2$) of the silica sol ($S_3$) in step (d). Mixing should be carried out with stirring (preferably vigorous stirring) at 0°-100° C., preferably 0°-50° C., for 0.1-5 hours. The resulting sol is adjusted to pH 4-7 with the same alkaline aqueous solution as mentioned above to give a negatively charged silica sol (designated as $S_6$), which is a product formed by planar aggregation of the negatively charged silica sol ($S_0$) and the positively charged silica sol ($S_5$).

According to observation by electron microscopy, this sol ($S_6$) was found to contain flat colloidal particles similar to those of the sol ($S_4$). The thickness is about 7-100 nm, and the diameter in the planar direction is 100-1000 nm, which is 10-150 times the thickness.

The above-mentioned step (d) or (f) yields a silica sol of flat large particles. This sol turns into a stable aqueous alkaline (pH 7-12) silica sol of flat large particles when mixed with an alkaline substance, or turns into a stable aqueous acidic (pH 2-4) silica sol of flat large particles when treated with a hydrogen-type cation-exchange resin and subsequently with a hydroxyl-type anion-exchange resin.

According to the present invention, the silica sol of flat large particles is obtained in the form of aqueous sol containing $SiO_2$ in an amount of 2-50 wt%, preferably 10-40 wt%. A sol of low concentration may be concentrated by evaporation or ultrafiltration. The acidic aqueous sol of this invention may be changed into an organosol if the medium (water) is replaced by a hydrophilic organic solvent. The medium replacement may be accomplished by distillation or ultrafiltration. The hydrophilic organic solvent includes, for example, methanol, ethanol, isopropanol, dimethylformamide, N,N'-dimethylacetamide, ethyl cellosolve, and ethylene glycol. In addition, the aqueous sol of the present invention will become a silica sol of positively charged flat large particles upon incorporation with the above-mentioned basic aluminum or zirconium salt.

Owing to step (d) or (f) in the process of the present invention, the aqueous sol of flat large particles has an average particle diameter of 200-600 nm (measured by the dynamic light scattering method) or 200-500 nm (measured by the centrifugal method) and a viscosity of 1.5-500 centipoise at 20° C. Especially, step (f) imparts long-term stability to the sol containing 2-50 wt% $SiO_2$.

Step (f) in the process of the present invention gives rise to a silica sol of flat large particles, each particle consisting of a large number of raw material colloidal silica particles (7-30 nm in diameter), presumably through planar aggregation. The aggregates are observed by electron microscopy. The sol keeps the aggregates intact even after vigorous agitation and remains stable without gelation and viscosity change even after storage at 60° C. for 1 month. This indicates that each flat particle is not a mere aggregate of raw material colloidal silica particles (7-30 nm in diameter) but is a single flat large particle consisting of colloidal silica particles configured in the planar direction by chemical bonding.

According to the above-mentioned conventional process, the aggregation of colloidal silica particles (7-30 nm in diameter) needs the micelle of a surface active agent, which prevents the complete chemical bonding of colloidal silica particles unless the system is heated. By contrast, the process of the present invention needs no heating because it does not employ the micelle of a surface active agent. It is considered that the formation of flat large particles is due to the chemical bonding which takes place immediately after the aggregation of positively charged colloidal silica particles and negatively charged colloidal silica particles (7-30 nm in diameter).

However, the positively charged colloidal particles will not be formed in step (a), if the acidic aqueous negatively charged silica sol ($S_0$) is mixed with the above-mentioned basic metal salt in an amount less than 0.2 wt% (as metal oxide) based on the amount of $SiO_2$ in the silica sol ($S_0$). On the other hand, the basic salt used in step (a) in an amount more than 10 wt% (as metal oxide) prevents the formation of flat large particles in step (b) or causes gelation upon mixing with the acidic aqueous negatively charged silica sol ($S_0$) in step (b) or gives rise to a viscosity increase (which is undesirable for the formation of a stable sol of flat large particles).

It is impossible to produce in step (b) a silica sol of flat large particles in high concentration, if the positively charged silica sol (S ) is mixed with an acidic aqueous negatively charged silica sol containing colloidal silica particles smaller than 7 nm, in which case gelation takes place during mixing. It is also impossible to produce in step (b) a stable silica sol of flat large particles, if the negatively charged silica sol contains colloidal silica particles larger than 30 nm.

Moreover, the resulting mixture in step (b) will be subject to viscosity increase or gelation if the amount of the acidic aqueous negatively charged silica sol ($S_0$) is less than 20 parts by weight (as $SiO_2$) for 100 parts by weight (as $SiO_2$) of the positively charged silica sol ($S_1$). On the other hand, the yield of a silica sol of flat large particles will be low if the amount of the acidic aqueous negatively charged silica sol ($S_0$) exceeds 200 parts by weight.

In step (c), the basic salt is used in a lesser amount than in step (a). Likewise, in step (e), the basic salt is used in a lesser amount than in step (c). The reason for this is to control the amount of charge on colloidal particles so that the particles of sol ($S_0$) easily undergo planar aggregation. In consequence of planar aggregation, there is obtained a stable silica sol of flat large particles. Steps (a) to (f) are especially effective in the production of a stable silica sol of flat large particles.

In steps (a) to (f), the addition of the basic salt (in the form of aqueous solution) or the sol ($S_0$) is followed by stirring to make the colloidal silica particles to capture as many Al or Zr ions as possible and to cause the planar aggregation of colloidal particles of the sol ($S_0$). During stirring, the temperature should be higher than the freezing point of the sol but lower than 100° C., preferably lower than 50° C., to avoid gelation.

Steps (a) to (f) involve the addition of an alkaline aqueous solution for pH adjustment of the sol to bring about the desirable planar aggregation and to keep the sol stable and free from gelation.

The process of the present invention should preferably be carried out in such a way as to produce a silica sol of flat large particles having an average particle diameter smaller than 600 nm (measured by the dynamic light scattering method). With particles larger than this limit, the sol is liable to form precipitates during long-term storage. Conversely, with particles smaller than 200 nm in diameter, the sol lacks the desirable properties characteristic of the flat large particles. In addition, it is desirable that the silica sol contain no more anions than necessary for its stabilization; the anion content is preferably less than 2000 ppm.

EXAMPLES

Raw materials for examples were prepared as follows:

Acidic aqueous silica sol ($S_0$), colorless transparent with a slight colloid color, having a particle diameter of 12.5 nm (measured by BET method), a concentration of 20.2 wt% (as $SiO_2$), a specific gravity of 1.127, a pH value of 2.8, and a viscosity of 2.0 cp at 20° C.

Aqueous solution (B) of basic aluminum chloride $Al_2(OH)_5Cl$, containing 23 wt% $Al_2O_3$ and 8.0 wt% Cl, and having a specific gravity of 1.35, a pH value of 4.0, and a viscosity of 50 cp at 20° C.

Aqueous solution ($B_1$) containing 2.0 wt% $Al_2O_3$, formed by diluting aqueous solution (B) with water.

Aqueous solution ($B_2$) containing 4.0 wt% $Al_2O_3$, formed by diluting aqueous solution (B) with water.

(In the following examples, adding of solution or sol was carried out vigorous stirring in an intensive mixer, and the measurement of particle diameter by dynamic light scattering method was carried out using Coulter's apparatus ($N_4$). Percent (%) means percent by weight.)

EXAMPLE 1

(a) The silica sol ($S_0$) in an amount of 800 g was diluted with 520 g of water. To the diluted silica sol was added 200 g of the aqueous solution (B ) of basic aluminum chloride at 20° C., followed by stirring at 20° C. for 20 minutes. To the silica sol was further added 7.0 g of 10% NaOH aqueous solution, followed by stirring at 20° C. for 20 minutes. Thus there was obtained a positively charged silica sol (S ) with pH 5.6.

(b) To the silica sol ($S_1$) was added 500 g of the silica sol ($S_0$) with stirring at 20° C., followed by stirring at 20° C. for 20 minutes. Thus there was obtained a milky white silica sol (2027 g) with pH 5.0. To this silica sol was added 2.2 g of 10% NaOH aqueous solution, followed by stirring at 20° C. for 10 minutes. Thus there was obtained a silica sol ($S_2$) with pH 6.5.

(c) To the silica sol ($S_2$) was added 70 g of the aqueous solution (B ) of basic aluminum chloride with stirring at 20° C., followed by stirring at 20° C. for 30 min To the silica sol was further added 5.0 g of 10% NaOH aqueous solution at 20° C., followed by stirring at 20° C. for 20 minutes. Thus there was obtained a silica sol (S$_3$) with pH 5.8.

(d) To the silica sol (S$_3$) was added 550 g of the silica sol (S$_0$) with stirring at 20° C., followed by stirring at 20° C. for 20 minutes. Thus there was obtained 2654.2 g of a milky white silica sol (S$_4$) with pH 5.2. This silica sol did not need pH adjustment with an alkaline aqueous solution. Incidentally, the colloidal silica was 330 nm in diameter.

(e) To the silica sol (S$_4$) was added 30 g of the aqueous solution (B$_1$) of basic aluminum chloride with stirring at 20° C., followed by stirring at 20° C. for 20 minutes. To the silica sol was further added 3.2 g of 10% NaOH aqueous solution at 20° C., followed by stirring at 20° C. for 30 minutes. Thus there was obtained a silica sol (S$_5$) with pH 5.1.

(f) To the silica sol (S$_5$) was added 650 g of the silica sol (S$_0$) with stirring at 20° C., followed by stirring at 20° C. for 30 minutes. Thus there was obtained a milky white silica sol (3337.4 g) with pH 4.8. Finally, to this silica sol was added 27.8 g of 10% NaOH aqueous solution at 20° C., followed by stirring at 20° C., for 20 minutes. Thus there was obtained 3365.2 g of the alkaline silica sol (S$_6$) pertaining to the present invention, which has pH 7.64, a specific gravity of 1.091, and a viscosity of 2.8 cp at 20° C., and contains 15.0% SiO$_2$, 0.18% Al$_2$O$_3$, 0.011% Na$_2$O (measured by titrimetry), and 0.115% Na$_2$O (measured by flame photometry), with the average particle diameter being 370 nm (measured by dynamic light scattering method).

The alkaline silica sol (S$_6$) pertaining to the present invention remained stable without gelation and viscosity increase even after storage at room temperature for 3 months. The individual colloidal silica particles are large enough for observation by electron microscopy (200,000 magnification). The electron micrograph reveals that each single colloidal silica particle is composed of a large number of colloidal silica particles derived from the silica sol (S$_0$) which are joined to one another in the planar direction.

EXAMPLE 2

(a) The silica sol (S$_0$) in an amount of 450 g was diluted with 280 g of water. To the diluted silica sol was added 100 g of the aqueous solution (B ) of basic aluminum chloride at 20° C., followed by stirring at 20° C. for 20 minutes. To the silica sol was further added 0.6 g of 28% ammonia water at 20° C., followed by stirring at 20° C. for 40 minutes. Thus there was obtained a silica sol (S$_1$) with pH 5.4.

(b) To the silica sol (S$_1$) was added 250 g of the silica sol (S$_0$) at 20° C., followed by stirring at 20° C. for 30 minutes. Thus there was obtained 1080.6 g of a milky white silica sol (S$_2$) with pH 4.8. No alkali was added to this silica sol.

(c) To the silica sol (S$_2$) was added 35 g of the aqueous solution (B$_1$) of basic aluminum chloride at 20° C., followed by stirring at 20° C. for 20 minutes. To the silica sol was further added 0.3 g of 28% ammonia water at 20° C., followed by stirring at 20° C. for 40 minutes. Thus there was obtained a silica sol (S$_3$) with pH 6.0.

(d) To the silica sol (S$_3$) was added 280 g of the silica sol (S$_0$) at 20° C., followed by stirring at 20° C. for 30 minutes. Thus there was obtained 1395.9 g of a milky white silica sol (S$_4$) with pH 5.4. No alkali was added to this silica sol. The average particle diameter was 250 nm (measured by dynamic light scattering method)

(e) To the silica sol (S$_4$) was added 15 g of the aqueous solution (B$_1$) of basic aluminum chloride at 20° C., followed by stirring at 20° C. for 20 minutes. To the silica sol was further added 0.25 g of 28% ammonia water at 20° C., followed by stirring at 20° C. for 40 minutes. Thus there was obtained a silica sol (S$_5$) with pH 5.7.

(f) To the silica sol (S$_5$) was added 350 g of the silica sol (S$_0$) at 20° C., followed by stirring at 20° C. for 40 minutes. Thus there was obtained 1731.1 g of a milky white silica sol (S$_6$) with pH 5.2. No alkali was added for pH adjustment. Finally, to this silica sol (S$_6$) was added 4.9 g of 28% ammonia water, followed by stirring for 3 hours. Thus there was obtained the milky white alkaline silica sol pertaining to the present invention, which has pH 8.25, a specific gravity of 1.092, and a viscosity of 4.0 cp at 20° C., and contains 15.1% SiO$_2$, 0.173% Al$_2$O$_3$, 0.098% NH:, and 0.02% NH: (measured by titrimetry), with the average particle diameter being 280 nm (measured by dynamic light scattering method). This silica sol remained stable without gelation and viscosity increase even after storage at room temperature for 3 months.

EXAMPLE 3

To 1720 g of the alkaline silica sol (pH 7.64) obtained in Example 1 was added 200 g of a hydroxyl-type anion-exchange resin. After mixing, the silica sol was separated from the anion-exchange resin and added with washed water. Thus there was obtained a silica sol with pH 9.97. Finally, the silica sol was concentrated by using a rotary evaporator. There was obtained 860 g of a milky white concentrated silica sol containing 30.0% SiO$_2$.

This silica sol has pH 10.1, a specific gravity of 1.211, and a viscosity of 105 cp at 20° C., and contains 0.36% Al$_2$O$_3$ and 0.08% Na$_2$O (measured by titrimetry), with the average particle diameter being 340 nm (measured by dynamic light scattering method). It remained stable without gelation and viscosity increase even after storage at room temperature for 3 months.

EXAMPLE 4

After dilution with 1000 g of water to 800 g of the silica sol (having pH 10.1 and containing 30.0% SiO$_2$) obtained in Example 3, the diluted sol was mixed with 200 g of H-type cation-exchange resin. After mixing, the silica sol was separated from the cation-exchange resin and added with washed water. Thus there was obtained 2180 g of acidic silica sol with pH 3.6.

This silica sol has a specific gravity of 1.050 and a viscosity of 85 cp at 20° C., and contains 11.0% SiO$_2$ and 0.132% Al$_2$O$_3$, with the average particle diameter being 430 nm (measured by dynamic light scattering method). It takes on a milky white color and exhibits the thixotropic properties. It remained stable without gelation and viscosity increase even after storage at room temperature for 3 months.

COMPARATIVE EXAMPLE 1

(a) The silica sol (S$_0$) in an amount of 800 g was diluted with 520 g of water. To the diluted silica sol was added 50 g of the aqueous solution (B ) of basic aluminum chloride at 20° C., followed by stirring at 20° C. for 20 minutes. To the silica sol was further added 2.3 g of 10% NaOH aqueous solution at 20° C., followed by stirring at 20° C. for 40 minutes. Thus there was obtained a silica sol (S$_1$) with pH 5.6.

(b) To the silica sol (S$_1$) was added 500 g of the silica sol (S$_0$) at 20° C., followed by stirring at 20° C. for 40 minutes. Thus there was obtained a milky white silica sol (1872.3 g) with pH 5.1. To this silica sol was added 20 g of 10% NaOH aqueous solution at 20° C., followed by stirring at 20° C. for 2 hours. Thus there was obtained a silica sol (S$_2$) in an amount of 1892.3 g.

This silica sol has pH 9.02, a specific gravity of 1.080, and a viscosity of 2.5 cp at 20° C., and contains 13.9% SiO$_2$, 0.053% Al$_2$O$_3$, 0.07% Na$_2$O (measured by titrimetry), and 0.1% Na$_2$O (measured by flame photometry), with the average particle diameter being 110 nm (measured by dynamic light scattering method). It should be noted that the silica sol (S$_2$) does not have a large particle diameter.

COMPARATIVE EXAMPLE 2

(a) The silica sol (S$_0$) in an amount of 400 g was mixed with 400 g of the aqueous solution (B$_1$) of basic aluminum chloride at 20° C., followed by stirring at 20° C. for 20 minutes. To the silica sol was further added 21 g of 10% NaOH aqueous solution at 20° C., followed by stirring at 20° C. for 30 minutes. Thus there was obtained a silica sol (S$_1$) with pH 5.2.

(b) To the silica sol (S$_1$) was added 400 g of the silica sol (S$_0$) at 20° C., followed by stirring at 20° C. for 30 minutes. The resulting product was nothing but a transparent positively charged silica sol (S$_2$) assuming a colloid color.

(c) To the silica sol (S$_2$) was added 400 g of the aqueous solution (B$_2$) of basic aluminum chloride at 20° C., followed by stirring at 20° C. for 20 minutes. To the silica sol was further added 21 g of 10% NaOH aqueous solution at 20° C.

(d) To the silica sol obtained in step (c) wa added 400 g of the silica sol (S$_0$) at 20° C., followed by stirring at 20° C. for 30 minutes. The resulting product was nothing but a transparent positively charged silica sol assuming a colloid color.

(e) To the silica sol obtained in step (d) was added 400 g of the aqueous solution (B$_1$) of basic aluminum chloride at 20° C., followed by stirring at 20° C. for 20 minutes. To the silica sol was further added 21 g of 10% NaOH aqueous solution at 20° C.

(f) To the silica sol obtained in step (e) was added 400 g of the silica sol (S$_0$) at 20° C., followed by stirring at 20° C. for 30 minutes. The resulting product was nothing but a transparent positively charged silica sol assuming a colloid color. This silica sol has pH 5.6 and a viscosity of 2.0 cp at 20° C., and contains 11.3% SiO$_2$ and 1.68% Al$_2$O$_3$, with the average particle diameter being 46 nm (measured by dynamic light scattering method).

The results of Comparative Example 2 indicate that the planar aggregation for flat large colloidal particles did not take place when the positively charged silica sol was mixed with the silica sol (S$_0$), because the basic aluminum chloride was added in an excess amount (20% as Al$_2$O$_3$ based on SiO$_2$) in step (a).

As mentioned above, the present invention provides a process for producing in a simple, effective manner, from an acidic aqueous silica sol of negatively charged colloidal particles 7-30 nm in diameter, a silica sol of flat large particles formed by planar aggregation of colloidal silica particles.

The silica sol prepared by the process of the present invention contains negatively charged flat large particles. It is stable and exhibits good film-forming properties in addition to the properties the conventional negatively charged spherical silica sol possesses. Therefore, it can be used alone in various application areas that need improvement. Moreover, it can be used in the form of a stable mixture with a dispersion of anionic particles. Such a mixture will also find use in various application areas that need improvement. The dispersion of anionic particles that forms stable mixtures includes, for example, conventional anionic silica sols, anionic metal oxide sols (other than silica sols), aqueous solution of water glass, anionic or nonionic surface active agents, water-soluble polyvinyl alcohol, polyvinylpyrrolidone, water soluble melamine resin, bentonite, sodium alginate, anionic or nonionic resin emulsions, hydrolyzed alkyl silicate solution, acids (such as phosphoric acid and chromic acid), aqueous solution of aluminum phosphate or calcium phosphate, and organic solvent solutions of hydrophilic organic resins.

As mentioned above, the process of the present invention gives a negatively charged silica sol of flat large particles. It can be modified into a positively charged silica sol of flat large particle, which can be used alone or in combination with other component in various application areas that need improvement. The silica sol of flat large particles may also be modified with a silane coupling agent. After drying, the modified silica sol gives a hydrophobic silica powder.

The above-mentioned silica sol of flat large particles will find use as a binder or filler for paints and adhesives, a binder for refractories and casting molds, a binder for inorganic fibers (such as ceramic fibers and glass fibers), treatment agents for organic fibers, an antislip agent for paper, a component of paper coating materials, a metal surface treatment agent, a component of anti-heat bonding agents and anti-oxidation agent for metals at high temperature, a filler for resins and films, and an abrasive for metals and semiconductors. When used in these application areas, the silica sol improves the dispersibility, binding power, adhesion, absorptivity, heat resistance, fireproofness, anti-electrostatic properties, hydrophilicity, friction characteristics, chemical resistance, and film-forming properties.

What is claimed is:

1. A process for producing an aqueous sol containing 2–50 wt% SiO$_2$ in the form of colloidal silica with a flat shape, whose thickness is 7–100 nm and whose dimension in the planar direction is 10–150 times the thickness and within the range of 100–1000 nm, said process comprising the steps of:

(a) mixing 100 parts by weight (as SiO$_2$) of an acidic aqueous sol (S$_0$) of negatively charged silica (7–30 nm in particle diameter) having pH 2–5 and containing 2–50 wt% SiO$_2$, with 0.2–10 parts by weight (as Al$_2$O$_3$ or ZrO$_2$) of an aqueous solution (B) containing 1–50 wt% basic aluminum or zirconium salt, with stirring at 0°–100° C., continuing stirring for 0.1–5 hours, and adjusting the resulting sol to pH 4–7 with an alkaline aqueous solution, thereby yielding an aqueous sol (S$_1$) of positively charged silica, (b) mixing 100 parts by weight (as SiO$_2$) of the sol (S$_1$) obtained in step (a) with 20–200 parts by weight (as SiO$_2$) of the sol (S$_0$) with stirring at 0°–100° C., continuing stirring for 0.1–5 hours, and adjusting the resulting sol to pH 4–7 with an alkaline aqueous solution, thereby yielding an aqueous sol ($S_2$) of negatively charged silica, (c) mixing 100 parts by weight (as $SiO_2$) of the sol ($S_2$) obtained in step (b) with the aqueous solution (B) in an amount corresponding to 2-50% of the amount (as $Al_2O_3$ or $ZrO_2$ in parts by weight) added to 100 parts by weight (as $SiO_2$) of the sol ($S_0$) used in step (a) with stirring at 0°-100° C., continuing stirring for 0.1-5 hours, and adjusting the resulting sol to pH 4-7 with an alkaline aqueous solution, thereby yielding an aqueous sol ($S_3$) of positively charged silica, and (d) mixing 100 parts by weight (as $SiO_2$) of the sol ($S_3$) obtained in step (c) with the sol ($S_0$) in an amount corresponding to 10-95% of the amount (as $SiO_2$ in parts by weight) added to 100 parts by weight (as $SiO_2$) of the sol ($S_1$) in step (b) with stirring at 0°-100° C., continuing stirring for 0.1-5 hours, and adjusting the resulting sol to pH 4-7 with an alkaline aqueous solution, thereby yielding an aqueous sol ($S_4$) of negatively charged silica.

2. A process as claimed in claim 1, wherein the basic aluminum or zirconium salt used in steps (a) and (c) is any one selected from the group consisting of Al(OH)$_2$Cl, Al$_2$(OH)$_5$Cl, Al(OH)$_2$(CH$_3$COO).$\frac{1}{3}$H$_3$BO$_3$, Al$_2$(OH)$_5$NO$_3$, Al(OH)$_2$(HCOO), ZrOCl$_2$.8H$_2$O, ZrO(NO$_3$)$_2$, ZrO(CH$_3$COO)$_2$, and mixtures thereof.

3. A process as claimed in claim 1, wherein the alkaline aqueous solution used in steps (a) to (d) contains 0.5-30 wt% alkali selected from the group consisting of LiOH, NaOH, KOH, and NH$_4$OH.

4. A process as claimed in claim 1, wherein the continued stirring in steps (a) to (d) is carried out at 0°-50° C.

5. A process as claimed in claim 1, wherein the acidic aqueous sol ($S_0$) of negatively charged silica used in steps (a), (b), and (d) has pH 2-5 and contains 5-30 wt% $SiO_2$, with the colloidal particles being spheres 7-20 nm in diameter.

6. A process as claimed in claim 1, which further comprises steps of:

(e) mixing 100 parts by weight (as $SiO_2$) of the sol ($S_4$) obtained in step (d) with the aqueous solution (B) in an amount corresponding to 2-50% of the amount (as $Al_2O_3$ or $ZrO_2$ in parts by weight) added to 100 parts by weight (as $SiO_2$) of the sol ($S_2$) used in step (c) with stirring at 0°-100° C., continuing stirring for 0.1-5 hours, and adjusting the resulting sol to pH 4-7 with an alkaline aqueous solution, thereby yielding an aqueous sol ($S_5$) of positively charged silica, and (f) mixing 100 parts by weight (as $SiO_2$) of the sol ($S_5$) obtained in step (e) with the sol ($S_0$) in an amount corresponding to 10-95% of the amount (as $SiO_2$ in parts by weight) added to 100 parts by weight (as $SiO_2$) of the sol ($S_3$) in step (d) with stirring at 0°-100° C., continuing stirring for 0.1-5 hours, and adjusting the resulting sol to pH 4-7 with an alkaline aqueous solution, thereby yielding an aqueous sol ($S_6$) of negatively charged silica.

7. A process as claimed in claim 6, wherein the basic aluminum or zirconium salt used in steps (a), (c) and (e) is any one selected from the group consisting of Al(OH)$_2$Cl, Al$_2$(OH)$_5$Cl, Al(OH)$_2$(CH$_3$COO).$\frac{1}{3}$H$_3$BO$_3$, Al$_2$(OH)$_5$NO$_3$, Al(OH)$_2$(HCOO), ZrOCl$_2$.8H$_2$O, ZrO(NO$_3$)$_2$, ZrO(CH$_3$COO)$_2$, and mixtures thereof.

8. A process as claimed in claim 6, wherein the alkaline aqueous solution used in steps (a) to (f) contains 0.5-30 wt% alkali selected from the group consisting of LiOH, NaOH, KOH, and NH$_4$OH.

9. A process as claimed in claim 6, wherein the continued stirring in steps (a) to (f) is carried out at 0°-50° C.

10. A process as claimed in claim 6, wherein the acidic aqueous sol ($S_0$) of negatively charged silica used in steps (a), (b), (d) and (f) has pH 2-5 and contains 5-30 wt% $SiO_2$, with the colloidal particles being spheres 7-20 nm in diameter.

* * * * *